United States Patent
Hentschel et al.

(10) Patent No.: US 11,340,564 B2
(45) Date of Patent: May 24, 2022

(54) METHOD AND CONTROL DEVICE FOR CONTROLLING A TECHNICAL SYSTEM

(71) Applicant: SIEMENS AKTIENGESELLSCHAFT, Munich (DE)

(72) Inventors: Alexander Hentschel, Vancouver (CA); Steffen Udluft, Eichenau (DE); Clemens Otte, Munich (DE)

(73) Assignee: SIEMENS AKTIENGESELLSCHAFT

(*) Notice: Subject to any disclaimer, the term of this patent is extended or adjusted under 35 U.S.C. 154(b) by 206 days.

(21) Appl. No.: 16/466,355

(22) PCT Filed: Dec. 5, 2017

(86) PCT No.: PCT/EP2017/081473
§ 371 (c)(1),
(2) Date: Jun. 4, 2019

(87) PCT Pub. No.: WO2018/104280
PCT Pub. Date: Jun. 14, 2018

(65) Prior Publication Data
US 2020/0064788 A1 Feb. 27, 2020

(30) Foreign Application Priority Data
Dec. 6, 2016 (DE) .................... 10 2016 224 207.5

(51) Int. Cl.
*G05B 13/04* (2006.01)
*G05B 13/02* (2006.01)

(52) U.S. Cl.
CPC ......... *G05B 13/048* (2013.01); *G05B 13/029* (2013.01)

(58) Field of Classification Search
CPC .................... G05B 13/048; G05B 13/029
See application file for complete search history.

(56) References Cited

U.S. PATENT DOCUMENTS

| 5,268,835 A | 12/1993 | Miyagaki et al. |
| 5,418,710 A | 5/1995 | Ono et al. |

(Continued)

FOREIGN PATENT DOCUMENTS

| CN | 1126307 A | 7/1996 |
| CN | 1598720 A | 3/2005 |

(Continued)

OTHER PUBLICATIONS

Hans A. et al. "Ensembles of Neural Networks for Robust Reinforcement Learning"; In: Machine Learning and Applications (ICMLA), 2010 Ninth international Conference an, IEEE, 2010, pp. 401-406; 2010.

(Continued)

*Primary Examiner* — Nathan L Laughlin
(74) *Attorney, Agent, or Firm* — Schmeiser, Olsen & Watts LLP

(57) ABSTRACT

In order to control a technical system, a system state of the technical system is continually detected. By a trained first control model, a subsequent state of the technical system is predicted on the basis of a sensed system state. Then, a distance value is determined for a distance between the predicted subsequent state and an actually occurring system state. Furthermore, a second control model is trained by the trained first control model to predict the distance value on the basis of a sensed system state and on the basis of a control action for controlling the technical system. A subsequent state predicted by the first control model is then modified on the basis of a distance value predicted by the trained second control model. The modified subsequent state is output in order to control the technical system.

14 Claims, 2 Drawing Sheets

(56) References Cited

U.S. PATENT DOCUMENTS

| | | | |
|---|---|---|---|
| 5,522,224 | A | 6/1996 | Canney |
| 6,668,214 | B2 | 12/2003 | Yasui et al. |
| 7,272,454 | B2 | 9/2007 | Wojsznis et al. |
| 7,493,207 | B2 | 2/2009 | Yasui et al. |
| 7,505,949 | B2* | 3/2009 | Grichnik ............. G05B 17/02 706/44 |
| 7,756,678 | B2 | 7/2010 | Bonissone et al. |
| 8,202,048 | B2 | 6/2012 | Stiesdal et al. |
| 8,977,402 | B2 | 3/2015 | Garcia |
| 9,798,304 | B2 | 10/2017 | Fan et al. |
| 10,338,542 | B2 | 7/2019 | Dull et al. |
| 2001/0025232 | A1* | 9/2001 | Klimasauskas ...... G05B 13/027 703/13 |
| 2003/0100974 | A1* | 5/2003 | Alvarez ........... G05B 19/41885 700/286 |
| 2003/0160457 | A1* | 8/2003 | Ragwitz ............. G05B 13/048 290/44 |
| 2005/0096758 | A1* | 5/2005 | Takezawa ........... G05B 13/048 700/44 |
| 2007/0021873 | A1 | 1/2007 | Richards |
| 2009/0216393 | A1* | 8/2009 | Schimert ........... G05B 23/0251 701/14 |
| 2013/0013543 | A1 | 1/2013 | Dull et al. |
| 2014/0344209 | A1* | 11/2014 | Fang .................. G06N 7/005 706/52 |
| 2016/0147203 | A1 | 5/2016 | Di Cairano et al. |
| 2017/0160706 | A1 | 6/2017 | Düll et al. |
| 2020/0143246 | A1* | 5/2020 | Li .................... G06F 16/285 |

FOREIGN PATENT DOCUMENTS

| | | |
|---|---|---|
| CN | 1828458 A | 9/2006 |
| CN | 101165331 A | 4/2008 |
| CN | 101298864 A | 11/2008 |
| CN | 102077437 A | 5/2011 |
| CN | 102508965 A | 6/2012 |
| CN | 103400210 A | 11/2013 |
| CN | 103649299 A | 3/2014 |
| CN | 104951851 A | 9/2015 |
| CN | 105956722 A | 9/2016 |
| CN | 106097146 A | 11/2016 |
| DE | 69228517 T2 | 8/1999 |
| DE | 102009025855 A1 | 12/2009 |
| DE | 102009025855 A1 | 12/2009 |
| DE | 102014212747 A1 | 1/2016 |
| EP | 2911018 A1 | 8/2015 |

OTHER PUBLICATIONS

Qingfeng, Liu et al: "A Data Mining Approach for Wind Turbine State Monitoring", Computer Measurement & Control, Year. Dec. 31, 2014, vol. 22, No. 5, pp. 1336-1339.

Deming, Wang wt al: "Wind Speed Forecast Model for Wind Farms Based on Genetic BP Neutral Network"; Mar. 27, 2021.

Hong, Yang et al: "Research of Statistic Regulation Capacity Limit Based on Wind Power Prediction"; Transactions of China Electrotechnical Society; vol. 29, No. 4, Year: Jan. 23, 2014.

Zaher A. et al: "Online Wind Turbine Fault Detection through Automated SCADA Data Anayisis"; Wind Energy; Year: Jan. 20, 2009, vol. 12, pp. 574-593.

Liping Yang et al: "Wind Farm Reactive Voltage Control System Application Situation Analysis"; China Academic Journal Publishing House; Technology Application; All rights reserved: http://www.cnki.net; pp. 72-76, Dec. 31, 2013.

Goodfellow I.J. et al.; "Generative Adversarial Nets", Jun. 10, 2014; Departement d'informatique et de recherche operationennelle Universite de Montreal; Montreal QC H3C 3J7; pp. 2-9; 2014.

Zhou, Bin et al.: "Feature Prediction and Model Updating based on Filter Banks"; Proccedings of The 23th Chinese Control Conference, Jul. 26-28, 2013, Xi'an China; pp. 3662-3667, Oct. 21, 2013.

Guo, Let et al.: "An Online Short-term Wind Power Prediction Considerinc Wind Speed Correction and Error Interval Evaluation"; 978-1-4799-3197-2/14/$31 00 © 2014 IEEE; pp. 28-32, Dec. 31, 2014.

Chinese Office Action dated Aug. 31, 2021 for Application No. 201780075886.6.

PCT International Search Report and Written Opinion of International Searching Authority dated Jun. 4, 2018 corresponding to PCT International Application No. PCT/EP2017/081473 filed Dec. 5, 2017.

* cited by examiner

METHOD AND CONTROL DEVICE FOR CONTROLLING A TECHNICAL SYSTEM

CROSS-REFERENCE TO RELATED APPLICATIONS

This application claims priority to PCT Application No. PCT/EP2017/081473, having a filing date of Dec. 5, 2017, which is based on German Application No. 10 2016 224 207.5, having a filing date of Dec. 6, 2016, the entire contents both of which are hereby incorporated by reference.

FIELD OF TECHNOLOGY

In the control of complex technical systems, including, for example, wind turbines, gas turbines, production installations, motor vehicles, or technical imaging or analysis systems, it is generally desirable to optimize a behavior, an action and/or an output of the technical system with respect to predefined criteria. State-of-the-art control systems for this purpose frequently employ complex control models, which deduce specific control data for the control of the technical system from a respective system state of the technical system. Control models of this type can specifically be employed for the prediction, simulation, analysis and/or classification of system states in the technical system. State-of-the-art control models are frequently based upon machine learning techniques, for example using neural networks, and can specifically be trained or configured, with reference to training data and/or to other operating data of the technical system, to optimize control with respect to predefined criteria.

BACKGROUND

Thus, for example, a control system of a wind turbine can learn, on the basis of training data, to adjust a setting angle of the rotor blades in the event of wind turbulence, in order to prevent any interruption of the air flux, thereby maximizing energy generation. Optimization is executed automatically, and generally requires no manual intervention.

In many technical systems, a behavior, an action and/or an output is more strongly influenced by external influencing factors such as, for example, wind speed or wind turbulence, than by internal control actions such as, for example, the abovementioned adjustment of the setting angle.

In many cases, influencing variables of this type also behave in a highly stochastic manner, and are only partially detectable. In such cases, machine learning of an optimum control strategy, i.e. of optimum control actions, can be substantially impaired.

SUMMARY

An aspect relates to a method and a control device for controlling a technical system, which permit more efficient training.

In order to control a technical system, e.g. a wind turbine, a solar energy installation, a solar energy power plant, a gas turbine, a motor vehicle, a production installation or another installation, a system state of the technical system is continually detected. A system state of this type can encompass e.g. physical, functionally-dependent, control engineering and/or structurally-related operating variables, properties, performance data, functional data, system data, setpoint values, control data, sensor data, measured values, environmental data and/or other data generated in the operation of the technical system. Specifically, the system state can also comprise a consequence of states or a state characteristic of the technical system. By means of a trained first control model, a subsequent state of the technical system is predicted on the basis of a detected system state. Thereafter a distance value is determined for a distance between the predicted subsequent state and an actually occurring system state. Furthermore, a second control model is trained by means of the trained first control model to predict the distance value on the basis of a detected system state, and on the basis of a control action for controlling the technical system. A subsequent state predicted by the first control model is then modified on the basis of a distance value predicted by the trained second control model. The modified subsequent state is generated as an output for the control of the technical system. On the basis of the modified subsequent state output, control actions to be implemented can specifically be determined, selected and/or planned.

For the execution of the method according to embodiments of the invention, a control device, a computer program product (non-transitory computer readable storage medium having instructions, which when executed by a processor, perform actions) and a computer-readable storage medium are provided.

One advantage of embodiments of the invention is provided in that, by the division of the modeling of the technical system into the first and the second control model, an influence of the control action upon a subsequent state can generally be detected substantially more effectively than in the case of a monolithic model of the technical system. This applies specifically if the influence of the control action upon the subsequent state is minor. In this manner, the success of training can generally be substantially increased. Moreover, substantially fewer training data and a shorter training time are required.

Advantageous forms of embodiments and further developments of embodiments of the invention are disclosed in the dependent claims.

The first and/or the second control model can comprise a neural network, a Gaussian process, a support vector machine, a data-driven trainable regression model, a physical model and/or a decision tree. For the abovementioned implementation variants of the control models, a variety of efficient training and learning methods are available.

The system state can further incorporate an influencing variable, the influence of which upon the technical system dominates an influence of the control action upon the technical system. An influencing variable of this type can specifically identify an external or internal influence upon the technical system, which can be environment-related, control engineering-related and/or functionally-dependent.

In a technical system in the form of a wind turbine, the influencing variable can specifically comprise a wind speed, a turbine capacity, a speed of rotation and/or an acceleration of the generating gear nacelle. Specifically, the wind speed has a substantially greater influence upon the power output than e.g. a setting of the rotor blades which in influenceable by control actions. Further examples of dominant influencing parameters include weather conditions in a solar energy power plant, gas temperatures in a gas turbine, the condition of workpieces in a production installation, or the speed of a motor vehicle.

In the event of dominant influencing variables, the separation of the control models according to embodiments of the invention has proven to be particularly advantageous, in relation to the prior art. Specifically, it is observed that an influence of the control action in the prediction of the distance value can generally be detected substantially more effectively than in the prediction of the subsequent state which is dominated by the influencing variable. This can be attributed to the fact that the dominating effects have previously been isolated by the trained first control model. Accordingly, the success of training can generally be substantially increased.

To the extent that the influencing variable is subject to statistical fluctuations, it can further be provided that the first control model is trained to optimize a statistical mean of a distance between the predicted subsequent state and an actually occurring system state, specifically by the minimization thereof. In this manner, even in the event of statistically fluctuating influencing variables and/or only partially measurable influencing variables, a relatively high quality of prediction can generally be achieved.

According to one advantageous form of embodiments of the invention, the first control model can be trained on the basis of detected system states of the technical system, specifically for the prediction of a subsequent state on the basis of a system state of the technical system.

Alternatively, or additionally, the first control model can also be trained on the basis of detected system states of a training system which differs from the technical system, specifically for the prediction of a subsequent state on the basis of a system state of the training system. Training of this type is frequently also described as transfer learning. By the employment of training data from other systems, the quantity of training data to be detected on the technical system itself can generally be substantially reduced. In this manner, the requisite training phases can be shortened, in many cases. As a result of the separation of the control models according to embodiments of the invention, inaccuracies associated with individual differences between the technical system and the training system are generally reduced, as these inaccuracies are refined, to a degree, by the second control model.

It can further be provided that, in the training of the first control model and/or in the prediction of the subsequent state, the control action is not considered. The actually existing influence of the control action, in the training of the first control model, is then present as a minor statistical interference variable, which scarcely influences the success of training or a predictive quality of the first control model. Conversely, the primary influence of the influencing variable is frequently detected more effectively.

According to a further advantageous form of embodiments of the invention, it can be provided that, for a plurality of control actions, a respective distance value is predicted by means of the trained second control model, and a predicted subsequent state is thus modified and assigned to the respective control action.

From the resulting modified subsequent states, a target state can then be selected, and the technical system can be controlled on the basis of the control action which is assigned to the selected target state. As a target state, that of the resulting modified subsequent states which optimizes a predefined criterion can specifically be selected. This criterion can relate to e.g. an output, a performance, a consumption of resources and/or wear of the technical system.

According to an advantageous further development of embodiments of the invention, a third control model, by means of the trained first control model and the trained second control model, can be trained, on the basis of a detected system state, to generate the output of an optimum control action for the control of the technical system. By way of an optimum control action, that control action can specifically be output which optimizes a modified subsequent state in accordance with a predefined criterion. As indicated above, the predefined criterion can relate to e.g. an output, a performance, a consumption of resources and/or wear of the technical system. A third control model of this type is also frequently described as a policy model.

The third control model can be trained by means of a reinforcement learning method.

BRIEF DESCRIPTION

Some of the embodiments will be described in detail, with references to the following Figures, wherein like designations denote like members, wherein.

DETAILED DESCRIPTION

Figure 1:
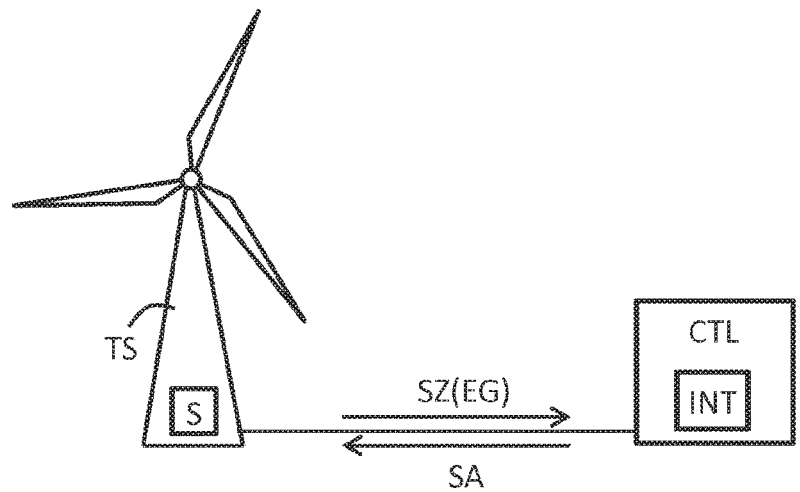
FIG. 1 shows a wind turbine and a control device according to embodiments of the invention for controlling the wind turbine.

FIG. 1 shows a schematic representation of a wind turbine by way of a technical system TS, which is coupled to a control device CTL according to embodiments of the invention for controlling the wind turbine TS. By way of a technical system TS, a solar energy installation, a solar energy power plant, a gas turbine, a production installation or another installation, a technical imaging or analysis system, a motor vehicle or a combination hereof can also be provided. The control device CTL can be implemented as an element of the technical system TS or can be implemented entirely or partially externally to the technical system TS. The control device CTL employs an interpreter INT for the execution of control models.

The technical system TS comprises sensors S for the continual detection and/or measurement of system states or subsystem states of the technical system TS. A respective sensor S can also be implemented in the form of a soft sensor.

A system state SZ of the technical system TS detected by means of the sensors S is specified or represented by status data. Status data of this type can include, for example, physical, control engineering-related, functionally-dependent and/or structurally-related operating variables, operating data, properties, performance data, functional data, system data, setpoint values, control data, environmental data, sensor data, measured values or other data generated in the operation of the technical system TS. The status data can specifically be represented by a data vector.

The status data include a target parameter which is to be optimized and which describes, for example, a capacity, an output and/or a behavior of the technical system TS. A target parameter can specifically be a feedback value from a "reward feature". The feedback value, for example a power output of the technical system TS, is determined as a function of a system state or a subsystem state. A reward feature of this type is also frequently described as a reward function.

The system state SZ can specifically comprise a state characteristic, for example in the form of a sequence or a vector of temporally sequential states which are progressively measured by the sensors S.

Furthermore, the system state SZ specifically comprises one or more dominant influencing variables EG. An influencing variable EG specifically designates an external or internal effect upon the technical system TS or upon operating conditions of the technical system TS. This effect or influence can be environment-related, physical, control engineering-related and/or functionally dependent. The influencing variable EG can also incorporate a time characteristic of an effect. In the present exemplary embodiments of a wind turbine by way of a technical system TS, the influencing variable EG can specifically comprise a measured wind speed. For the detection of the wind speed, one of the sensors S can be configured as an anemometer.

The influence of the influencing variable EG upon the technical system TS specifically dominates an influence of a control action SA upon the technical system TS. Thus, in the case of a wind turbine—as mentioned above—the wind speed generally has a substantially greater influence upon the power output of the wind turbine than, for example, a setting of the rotor blades. Further examples of dominant influencing variables EG, in the case of wind turbines, include a turbine capacity, a speed of rotation of the rotor and/or an acceleration of the generating gear nacelle, the weather conditions in the case of a solar energy power plant, a gas temperature in the case of a gas turbine, the condition of workpieces in the case of production installations, and the speed of a motor vehicle. The influencing variable EG is continually measured by means of the sensors S and is specified or represented by status data.

In the present exemplary embodiments, the system state SZ, and the influencing variable EG included therein, is communicated in the form of status data by the technical system TS to the control device CTL. Depending upon the system state SZ communicated, the control device CTL determines optimized control actions SA, and communicates these to the technical system TS for the purposes of control.

By means of a respective control action SA, the technical system TS is controlled, wherein the control action SA is executed by the technical system TS. The technical system TS thus executes a changeover from a current system state to a subsequent state. A control action SA of this type is also frequently described as an action, an action variable or a control variable, and is specified or represented by control data. Specifically, the control data can also include control signals, simulation data, forecast data, analysis data, status data, classification data, monitoring data and/or other control-related data, i.e. data contributing to the control of the technical system. Specifically, the control action SA can also comprise an action sequence. As mentioned above, it is assumed that the influence of the control action SA on the technical system TS is dominated by the influencing variable EG.

Figure 2:
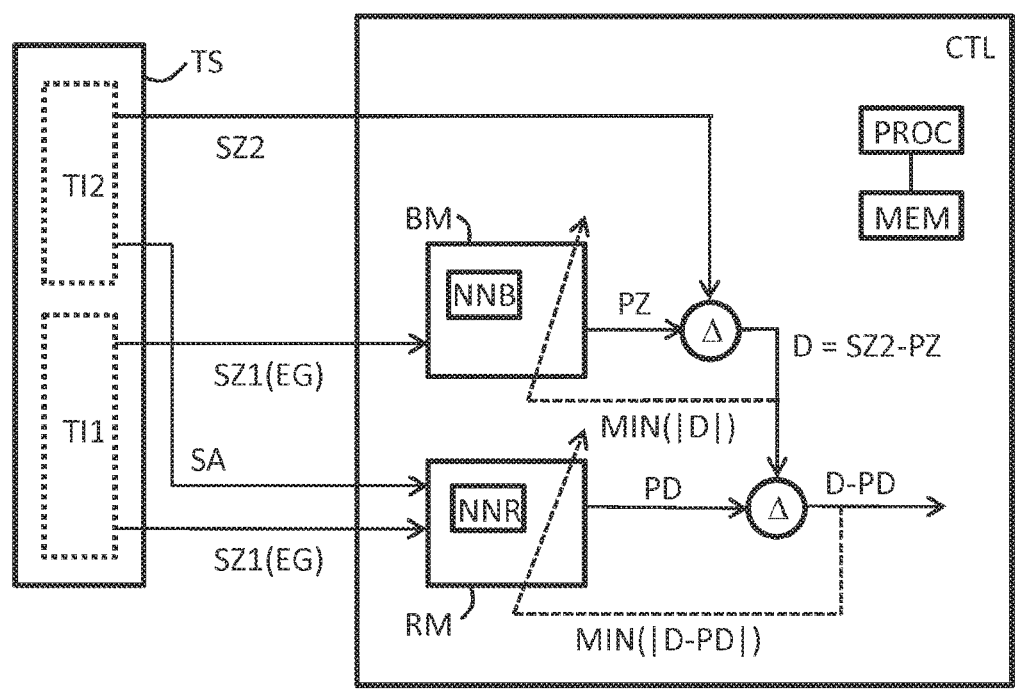
FIG. 2 shows the training of a control device according to embodiments of the invention for controlling a technical system.

FIG. 2 shows a schematic representation of the training of the control device CTL.

The control device CTL coupled to the technical system TS comprises one or more processors PROC for the execution of process steps of the control device CTL, and one or more memories MEM, which are coupled to the processor PROC, for the saving of the data to be processed by the control device CTL.

The control device CTL further comprises two separate control models BM and RM.

In the present exemplary embodiments, a control model is to be understood as a trainable control module, e.g. in the form of a neural network, with a model of the technical system TS. The control model comprises an adaptive training structure and is frequently also described as a system model.

Training is to be understood as the optimization of the modeling of input parameters of a system model on one or more target parameters. This modeling is optimized in accordance with predefined, learned and/or learnable criteria during a training phase. Criteria considered in predictive models can specifically include a forecast quality, a classification quality, an analysis quality and/or a simulation quality, or—additionally—a forecast error, a classification error, an analysis error and/or a simulation error. Alternatively, or additionally, a performance, a consumption of resources, an output and/or wear of the technical system TS can be applied as a criterion. As a forecast quality, for example, a distance between a predicted and an actually occurring value for the target parameter can be employed. In this manner, a predictive model can be trained for the minimization of a respective distance between the predicted and the actually occurring system state, i.e. for the most accurate possible prediction of a system state. Training of this type is also frequently described as machine learning.

For the training of a control model, a variety of standard training methods are generally available, including e.g. methods for monitored, unmonitored and/or reinforcement learning. The optimization criteria can be represented by an appropriate cost function, for the minimization of which a known learning method is executed.

A control model can specifically be implemented by means of a neural network, a support vector machine, a decision tree, generally a data-driven trained regression model, an analytical model or a combination hereof. In a neural network, by means of training, for example, a meshed structure of neurons, threshold values for neurons and/or the weighting of connections between neurons is optimized with respect to an optimization criterion, i.e. is configured for the optimization of the abovementioned modeling. In the data-driven regression model, coefficients for this model are optimized.

A control model is employed for the simulation or analysis of a physical, control engineering-related, stochastic and/or other interdependence of the technical system TS or an element thereof, for the forecasting or classification of operating data, status data, control data or other system data and/or for the control of the technical system TS. The control model models the technical system TS, or an element thereof, together with external influences, by which the technical system TS is influenced, or in accordance with which the technical system TS is controlled. The control model can be implemented as a module, a function or a routine, input data infed as input parameters, and the resulting output data deduced as the target parameter, in accordance with the training structure thereof. The system model is to be trained such that, from the input data, output data which are optimized with respect to predefined criteria can be deduced.

According to embodiments of the invention, the control device CTL incorporates a first control model BM, also described as a basic model, and a second control model RM, also described as a residual model. Both control models BM and RM are implemented as described above, and are respectively encoded by a data structure, which is decodable and executable by the interpreter INT.

The basic model BM and the residual model RM are trained with reference to detected system states and control actions of the technical system TS. The system states and control actions are thus assigned to different logic time intervals TI1 and TI2.

As the first-time interval TI1, a time interval is described in which the currently detected system state or state characteristic SZ1 is present in the form of status data. The second time interval TI2 temporally follows the first-time interval TI1. During the first-time interval TI1, a system state SZ2 occurring in the second time interval TI2 is not yet known and is to be predicted as accurately as possible by the trained control device CTL, with reference to the detected system state SZ1, as a subsequent state thereto. At the end of the second time interval TI2, the actually occurring system state SZ2 during this time interval TI2 is also then detected in the form of status data, and can be compared with the predicted subsequent state, in order to determine a predictive quality.

The basic model BM is intended, on the basis of the currently detected system state SZ1, to predict a subsequent state PZ. In order to train the basic model BM for this purpose, the technical system TS communicates a currently detected system state SZ1 from the first-time interval TI1 to the basic model BM, as an input parameter. The system state SZ1 specifically comprises a dominant influencing variable EG, for example a currently measured wind speed. As described above, the influencing variable EG dominates an influence of a control action SA upon the technical system TS. Additionally, for the training of the basic model BM, an actually occurring system state SZ2 from the second time interval TI2 is communicated by the technical system TS to the control device CTL.

In the present exemplary embodiments, the basic model BM is implemented by a neural network NNB. From the system state SZ1, as an input parameter, the neural network NNB infers a predicted subsequent state PZ as a target parameter, which is compared with the system state SZ2, wherein a distance value D for a distance between the predicted subsequent state PZ and the system state SZ2 is determined. The distance value D represents a predictive error of the basic model BM and, in the present exemplary embodiments, is determined as the difference D=SZ2−PZ. A magnitude |D| of the distance value D is determined, and is fed back to the basic model BM. As the distance magnitude |D|, for example, a Euclidian distance of the vectors represented, or another form of a scalar product or a different vector space norm, can be employed. On the basis of the magnitude |D| fed back, the neural network NNB—as represented by a broken arrowhead line—is trained to minimize a statistical mean of the distance between a predicted subsequent state, in this case PZ, and a system state actually occurring in the second time interval TI2, in this case SZ2, i.e. to predict the subsequent state, by way of a statistical mean, as accurately as possible. The statistical mean can specifically be a, where applicable, weighted arithmetical or geometrical mean value which is constituted over a time window, for example as a sliding average. Control actions SA are not considered in the training of the basic model BM. An influence of these control actions SA enters into the training of the basic model BM as a minor statistical interference variable which, in relation to statistical fluctuations in the influencing variable EG, is generally negligible. This negligence generally has little influence upon the success of training or the predictive quality of the basic model BM.

In the abovementioned manner, the basic model BM is trained to detect primary dependencies between the dominant influencing variable EG, in this case e.g. the wind speed, and the system behavior which is dictated thereby.

Alternatively, or additionally, the basic model BM can also be trained on the basis of system states of an (unrepresented) training system which differs from the technical system TS, for example of an identical or similar type to a wind turbine. Training of this type is also frequently described as transfer learning.

Further to the completion of the training of the basic model BM, the residual model RM is trained. In the present exemplary embodiments, the residual model RM is implemented by a neural network NNR. The function of the residual model RM, on the basis of a currently detected system state SZ1 and a control action SA, is the most accurate possible prediction of the distance value D determined by means of the trained basic model BM. In order to train the residual model RM for this purpose, a currently detected system state SZ1 in the first-time interval TI1 and a control action SA in the second time interval TI2 are communicated by the technical system TS to the residual model RM. The control action SA is assigned to the second time interval TI2, to the extent that the system state SZ2 in the second time interval TI2 is dictated by this control action.

For the training of the residual model RM, the previously trained basic model BM is employed, on the basis of the system state SZ1, to predict a subsequent state PZ. In this prediction by the trained basic model BM, control actions SA—as previously in the training of the basic model BM—are not considered. The subsequent state PZ predicted by the basic model BM is compared with the system state SZ2, and the distance value D is thus determined, as described above. At the same time, the neural network NNR, from the system state SZ1 and the control action SA by way of input parameters, infers a predicted distance value PD as a target parameter. The predicted distance value PD is compared with the distance value D actually determined by means of the basic model BM, wherein a distance between the distance value D and the predicted distance value PD is determined, for example as a difference D−PD. A magnitude |D−PD| of this distance is fed back to the residual model RM, in order to train the neural network NNR thereof, on the basis of the magnitude fed back—as represented by a broken arrowhead line—, to minimize the distance between the predicted and the actual distance value, i.e. to predict the distance value D as accurately as possible.

It emerges that the influence of control actions SA in the distance values D can generally be detected substantially more effectively than in the system states which are dominated by the influencing variable EG. This can be attributed to the fact that the dominating effects have previously been isolated by the trained basic model BM. By the separation of the modeling of the technical system TS into the basic model BM and the residual model RM, the success of training of the control device CTL can generally be substantially increased. Moreover, in general, fewer training data and a shorter training time are required.

Figure 3:
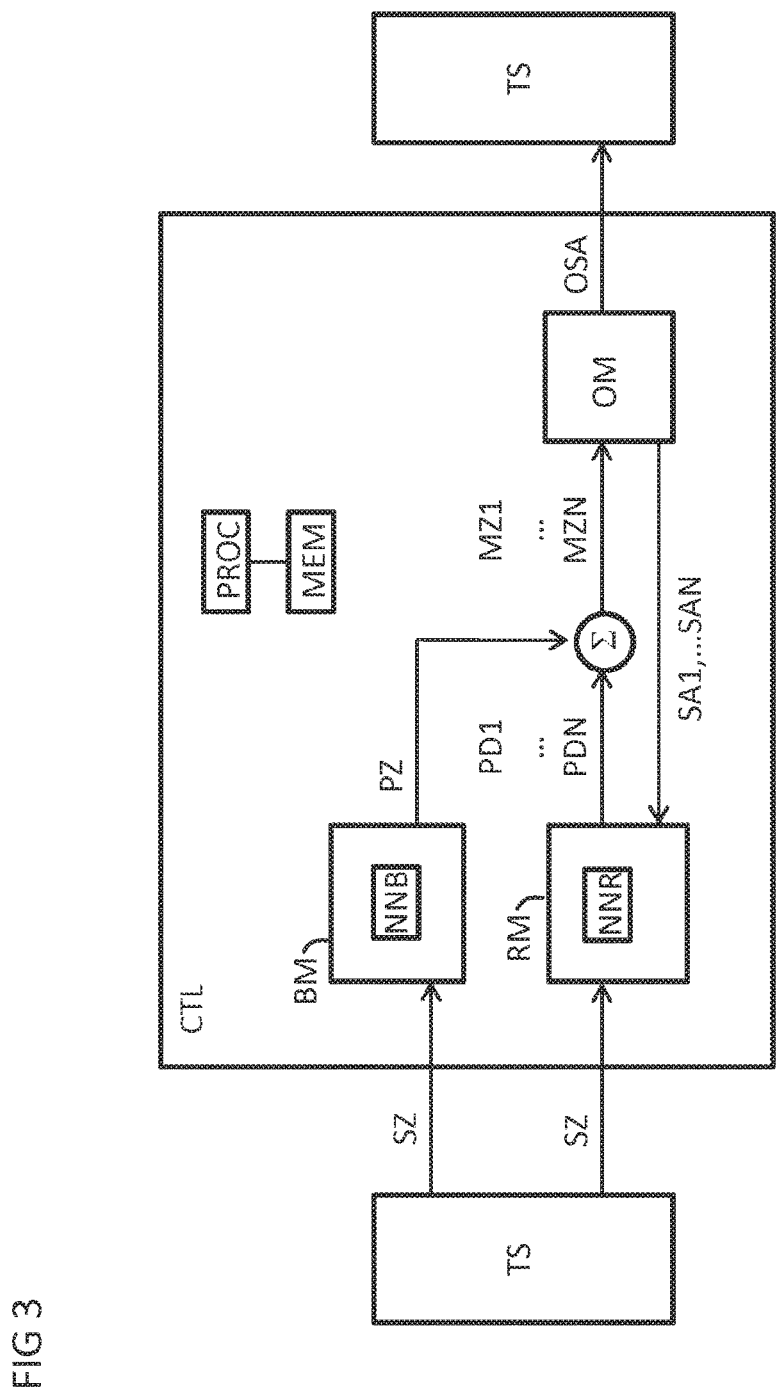
FIG. 3 shows the control of the technical system by means of the trained control device.

FIG. 3 illustrates a schematic representation of the control of the technical system TS by means of the trained control device CTL, i.e. by means of the basic model BM and the residual model RM. The elements represented in FIG. 2 are identified in FIG. 3 by the same reference numbers. In the interests of clarity, the same technical system TS is represented separately on both sides of the control device CTL. In FIG. 3, additionally to FIG. 2, an optimization module OM of the control device CTL is represented.

The function of the optimization module OM is to determine, for a respective current system state or state characteristic SZ, a control action OSA, which is optimized with respect to a predefined control criterion, for the control of the technical system TS. The control criterion can relate, for example, to an output, a performance, a consumption of resources and/or wear of the technical system TS and can be implemented by an appropriate cost function or reward function, which delivers the output, performance, consumption of resources or wear as a function of the system state SZ.

In the context of the control of the technical system TS, a current system state SZ is detected by the control device CTL of the technical system TM, and is routed to the basic model BM and the residual model RM. Moreover, the optimization module OM generates a plurality of control actions SA1, . . . , SAN, which are communicated to the residual model RM. The trained basic model BM, on the basis of the system state SZ thus communicated, then predicts a subsequent state PZ, and the trained residual model RM, on the basis of the system state SZ and the control actions SA1, . . . , SAN communicated, as described above, predicts a respectively resulting distance value PD1, . . . or PDN, for a respective control action SA1, . . . or SAN. The predicted subsequent state PZ is then respectively modified by reference to the predicted distance values PD1, . . . , PDN, in order thus to determine a modified subsequent state MZ1, . . . or MZN. The modified subsequent states MZ1, . . . , MZN are respectively assigned to the control action SA1, . . . or SAN deployed. The modification is executed such that the predicted distance values PD1, . . . , PDN are respectively added to the predicted subsequent state PZ, such that $MZ1=PZ+PD1$, . . . , $MZN=PZ+PDN$. The resulting modified subsequent states MZ1, . . . , MZN are communicated to the optimization module OM.

By means of the optimization module OM, from the modified subsequent states MZ1, . . . , MZN, that or those subsequent states which optimize the predefined control criterion are selected as target states. Alternatively, or additionally, the optimization module OM can execute a digital optimization method which, according to previously generated control actions and the selected subsequent states, generates further optimized control actions, communicates the latter to the residual model RM, evaluates the resulting modified subsequent states by means of the control criterion, and executes a corresponding new selection. An optimization method of this type can be executed iteratively.

For the modified subsequent state ultimately selected, which optimizes the control criterion, the control action assigned thereto is then determined, and is generated as an output by the optimization module OM in the form of an optimized control action OSA.

Alternatively, or additionally to the optimization module OM, a third (unrepresented) control model PM can be provided which, by means of the trained basic model BM and the trained residual model RM, by reference to current system states SZ, is trained for the output of such optimized control actions OSA as will optimize the abovementioned control criterion. The third control model PM is trained by means of reinforcement learning methods. A third control model of this type is frequently also described as a policy model.

The optimized control action OSA generated as an output by the optimization module OM or by the third control module PM is ultimately employed by the control device CTL to control the technical system TS.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for controlling a technical system, comprising:
   a) continually detecting a system state of the technical system,
   b) predicting, by a trained first control model, a subsequent state of the technical system on the basis of the detected system state,
   c) determining a distance value for a distance between the predicted subsequent state and an actually occurring system state,
   d) training a second control model by the trained first control model to predict the distance value on the basis of a detected system state, and on the basis of a control action for controlling the technical system,
   e) modifying the subsequent state predicted by the first control model on the basis of the distance value predicted by the trained second control model, and
   f) generating the modified subsequent state as an output for the control of the technical system.

2. The method as claimed in claim 1, wherein at least one of the first and the second control model comprises a neural network, a Gaussian process, a support vector machine, a data-driven trainable regression model, a physical model and/or a decision tree.

3. The method as claimed in claim 1, wherein the system state incorporates an influencing variable, the influence of which upon the technical system is greater than an influence of the control action upon the technical system.

4. The method as claimed in claim 3, wherein the technical system is a wind turbine, and the influencing variable comprises a wind speed, a turbine capacity, a speed of rotation and/or an acceleration of the generating gear nacelle.

5. The method as claimed in claim 3, wherein the influencing variable is subject to statistical fluctuations, and in that the first control model is trained to optimize a statistical mean of a distance between the predicted subsequent state and an actually occurring system state.

6. The method as claimed in claim 1, wherein the first control model is trained on the basis of detected system states of the technical system.

7. The method as claimed in claim 1, wherein the first control model is trained on the basis of detected system states of a training system which differs from the technical system.

8. The method as claimed in claim 1, wherein at least one of in the training of the first control model and in the prediction of the subsequent state, the control action is not considered.

9. The method as claimed in claim 1, wherein for a plurality of control actions, a respective distance value is predicted by the trained second control model, and a predicted subsequent state is thus modified and assigned to the respective control action, in that, from the resulting modified subsequent states, a target state is selected, and in that the technical system is controlled on the basis of the control action which is assigned to the selected target state.

10. The method as claimed in claim 1, wherein a third control model, by the trained first control model and the trained second control model is trained, on the basis of a detected system state, to generate the output of an optimum control action for the control of the technical system.

11. The method as claimed in claim 10, wherein the third control model is trained by a reinforcement learning method.

12. A control device for the control of a technical system, which is designed to execute a method as claimed in claim 1.

13. A computer program product, comprising a computer readable hardware storage device having computer readable program code stored therein, said program code executable by a processor of a computer system to implement a method for controlling a technical system, the method comprising:

a) continually detecting a system state of the technical system, b) predicting, by a trained first control model, a subsequent state of the technical system on the basis of the detected system state, c) determining a distance value for a distance between the predicted subsequent state and an actually occurring system state, d) training a second control model by the trained first control model to predict the distance value on the basis of a detected system state, and on the basis of a control action for controlling the technical system, e) modifying the subsequent state predicted by the first control model on the basis of the distance value predicted by the trained second control model, and f) generating the modified subsequent state as an output for the control of the technical system.

14. A non-transitory computer-readable storage medium containing a computer program product as claimed in claim 13.

* * * * *